United States Patent
Perez-Feliciano et al.

(10) Patent No.: US 9,542,283 B2
(45) Date of Patent: Jan. 10, 2017

(54) PREVENTING REMOVAL OF HOT-SWAPPABLE COMPONENTS

(71) Applicant: Lenovo (Singapore) Pte. Ltd., Singapore (SG)

(72) Inventors: David Perez-Feliciano, Morrisville, NC (US); Amy Leigh Rose, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 197 days.

(21) Appl. No.: 14/330,561

(22) Filed: Jul. 14, 2014

(65) Prior Publication Data

US 2016/0011949 A1    Jan. 14, 2016

(51) Int. Cl.
| | |
|---|---|
| *G06F 11/00* | (2006.01) |
| *G06F 11/20* | (2006.01) |
| *G06F 13/00* | (2006.01) |
| *G06F 1/00* | (2006.01) |
| *G06F 11/32* | (2006.01) |

(52) U.S. Cl.
CPC ............. *G06F 11/2033* (2013.01); *G06F 1/00* (2013.01); *G06F 11/327* (2013.01); *G06F 13/00* (2013.01); *G06F 2201/805* (2013.01)

(58) Field of Classification Search
CPC ............. G06F 11/2033; G06F 11/0772; G06F 11/0766;G06F 11/20; G06F 2201/805; G06F 13/4081; G06F 11/327; G06F 13/00; G06F 1/00
USPC ........................... 714/3, 4.12, 40, 44, 48, 57
See application file for complete search history.

(56) References Cited

U.S. PATENT DOCUMENTS

| | | | | |
|---|---|---|---|---|
| 6,549,969 | B1* | 4/2003 | Hsu | E05B 17/22 310/325 |
| 7,000,153 | B2* | 2/2006 | Inagawa | G06F 11/26 710/302 |
| 2003/0043561 | A1* | 3/2003 | Brooks | G06F 1/184 361/796 |
| 2003/0167367 | A1* | 9/2003 | Kaushik | G06F 13/4081 710/302 |
| 2011/0090087 | A1* | 4/2011 | Berke | G08B 21/02 340/584 |
| 2014/0331009 | A1* | 11/2014 | Parsonese | G06F 21/80 711/115 |

\* cited by examiner

*Primary Examiner* — Joseph D Manoskey
(74) *Attorney, Agent, or Firm* — Ference & Associates LLC (57) ABSTRACT

One embodiment provides an apparatus, including: at least one hot-swappable component; at least one engagement device, wherein the engagement device selectively operates to prevent removal of a non-failed hot-swappable component from a carrier; and a detector; the detector detecting at least one failed hot-swappable component. Other embodiments are described and claimed herein.

25 Claims, 5 Drawing Sheets

PREVENTING REMOVAL OF HOT-SWAPPABLE COMPONENTS

BACKGROUND

Many components in a system are hot-swappable, meaning they can be removed and reinstalled in a system while the system remains powered on. For example, these devices include anything from keyboards and mice to hard disk drives, power supplies, and bus cards, etc. This allows a user to replace a component while the system remains operational, such as if a component fails. When a component fails, it may have some type of visual indication, for example, a colored light, flashing light, or the like, to indicate that the device has failed. Additionally, some systems with hot-swappable components may have built-in redundancy, meaning the system has two or more components that perform the same function. If the component currently performing the function fails, a second component will take over and perform the function. Even though a component has failed, the system will remain operational, as long as the backup component remains functional.

BRIEF SUMMARY

In summary, one aspect provides an apparatus, comprising: at least one hot-swappable component; at least one engagement device, wherein the engagement device selectively operates to prevent removal of a non-failed hot-swappable component from a carrier; and a detector; the detector detecting at least one failed hot-swappable component.

A further aspect provides an information handling device, comprising: at least one hot-swappable component; at least one processor operatively coupled to the at least one hot-swappable component; and a memory storing instructions that are executable by the processor to: detect a failure of at least one hot-swappable component; and operate at least one engagement device upon the detection of the failure, wherein the at least one engagement device is disposed such that upon operation, removal of at least one non-failed hot-swappable component is prevented.

Another aspect provides a method, comprising: detecting, using a detector, at least one failed hot-swappable component; and operating, using a processor, at least one engagement device; the at least one engagement device being disposed such that upon engagement, at least one hot-swappable component is retained preventing removal of the at least one hot-swappable component.

A further aspect a method, comprising: detecting, using a processor, operation of an ejection device of at least one non-failed hot-swappable component; and providing, using a processor, an alarm to a user; the alarm indicating that the ejection device has been operated of the at least one non-failed hot-swappable component.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

Many components of a system are hot-swappable, meaning they can be disconnected and connected to the system while the system remains powered. In some systems, hot-swappable devices, for example hard disk drives, power supplies, bus cards, and the like, have a redundant component (i.e., a backup component that performs the same function as the primary component and is used if the primary component is no longer functioning or communicating), allowing the system to remain operational even when a device fails (i.e., the device is no longer operating as intended). Once a device fails, the user of a system is generally notified that a device has failed. For example, a system may audibly alarm, have visual indicators (e.g., flashing lights, different colored lights, pop-up messages, etc.), or the like, to indicate to the user that a device in the system is non-operational.

Some systems may have built in redundancy (i.e., components have a primary and a backup component) in which, in a case of a failure, a backup component may take over the function of the primary component allowing the system to remain operational. The user may then replace the primary component. However, if the user removes the backup component (i.e., the non-failed component), the system may fail and become nonoperational. In some cases, the system does not have built in redundancy, but rather the remaining components take on the workload of a failed component. In these systems the removal of an additional component may cause the system to fail and become nonoperational. Currently, some components have a visual indication (e.g., different colored lights, flashing lights, displays including error codes, etc.), to indicate to a user that the component has failed. However, this does not necessarily ensure that the correct component (i.e., the failed component) will be removed.

Accordingly, an embodiment provides an apparatus that prevents the removal of a non-failed component. One embodiment, upon detection of a failed component, may engage an engagement device, for example, a mechanical device, an electrical device, or software that prevents the non-failed component from being removed. Alternatively or additionally, upon detection of a failed component, an embodiment may disengage an engagement device for the component that has failed.

Another example embodiment provides a method for alerting the user that the wrong device is being removed. An embodiment may detect that the user has operated an ejection device for a non-failed component and may then provide an alarm to the user. This may thereby alert the user that they are trying to remove a non-failed component.

The illustrated example embodiments will be best understood by reference to the figures. The following description is intended only by way of example, and simply illustrates certain example embodiments.

Figure 1:
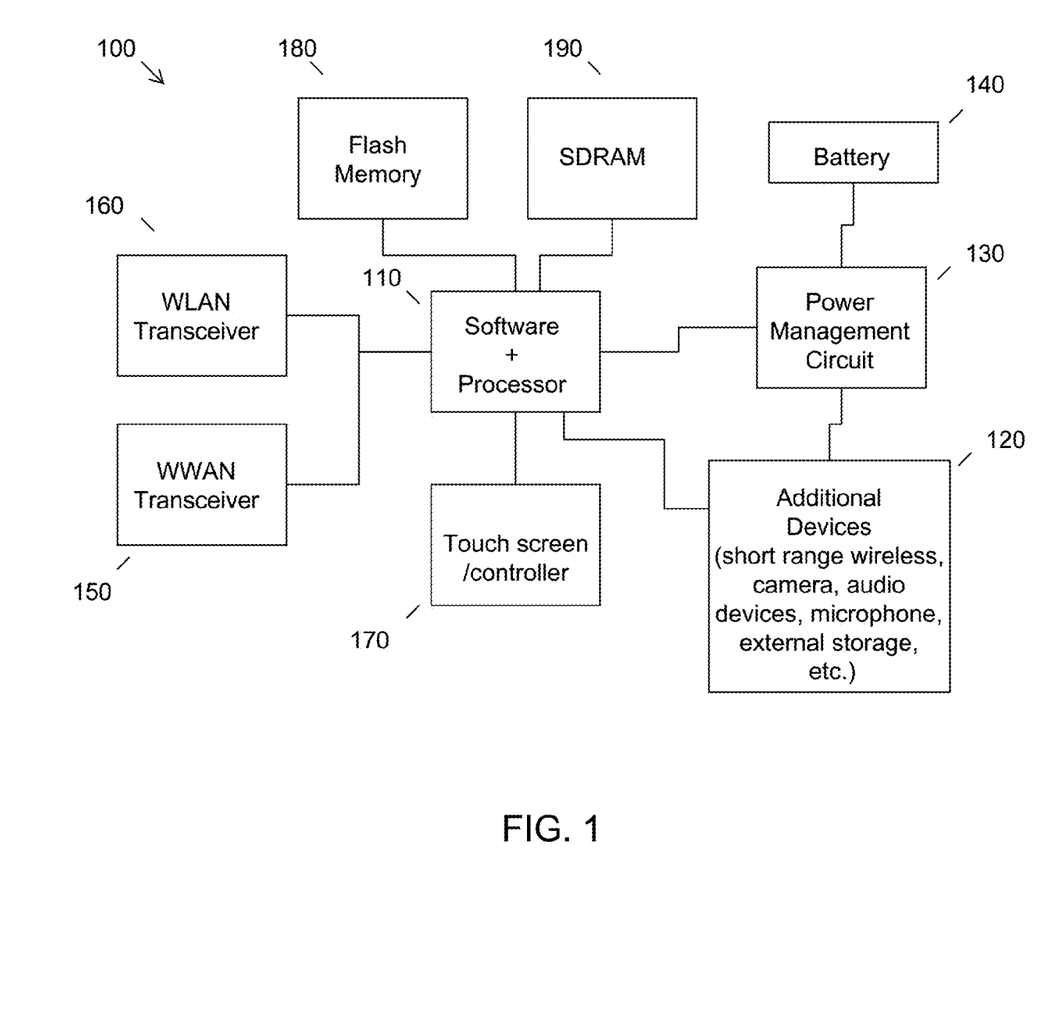
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120), for example a keyboard, camera, microphone, and the like, may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., such as a camera, microphone, audio device, or other input devices. System 100 often includes a touch screen 170 for data input and display/rendering. System 100 also typically includes various memory devices, for example flash memory 180 and SDRAM 190.

Figure 2:
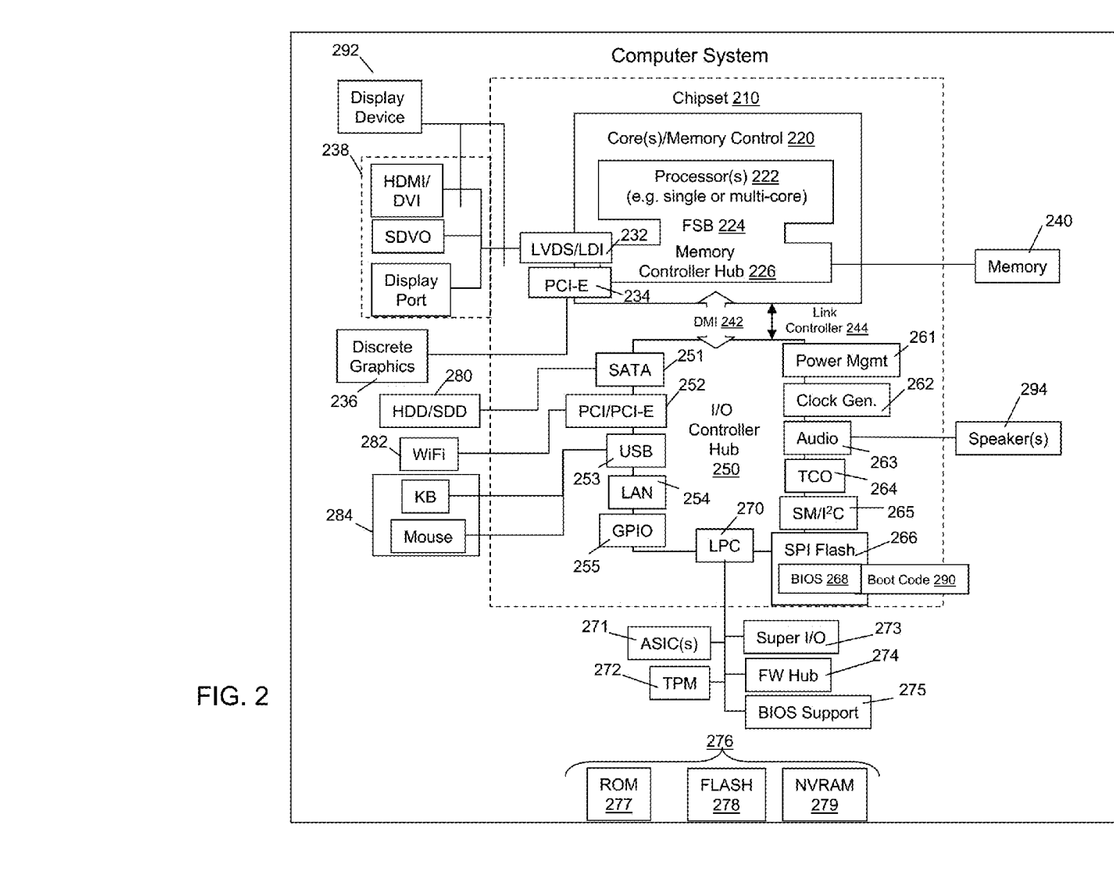
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a flat panel display, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may include hot-swappable components. Alternatively or additionally, information handling devices, such as those outlined in FIG. 1 or FIG. 2, may be used to control a system including hot-swappable components.

Figure 3:
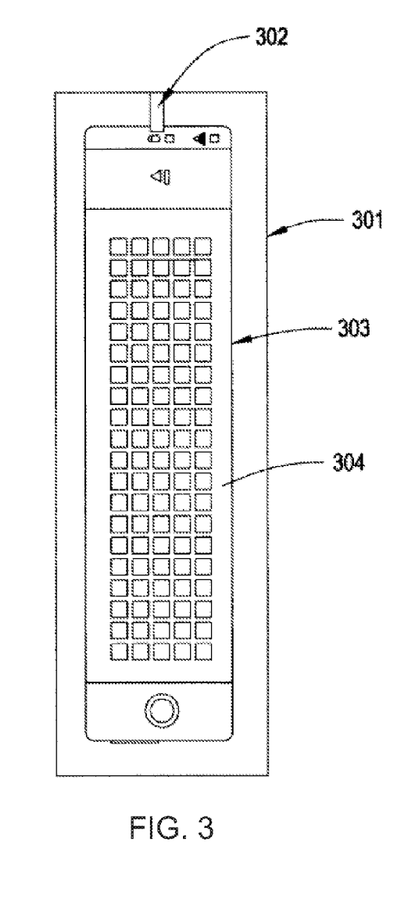
FIG. 3 illustrates an example system including a hot-swappable device.

Referring now to FIG. 3, in an embodiment a hot-swappable component 303 (e.g., hard disk drive, power supply, bus card, etc.) is included in a carrier 301, for example, a rack mount server, a tower mount system, a personal computer, and the like. For example, a hot-swappable hard disk drive may be installed in a rack-mount server or tower mount server, a hot-swappable power supply may be installed in a personal computer or rack mount enclosure, a hot-swappable bus card may be installed in a system which is then installed in a rack, etc. In one embodiment, an engagement device 302, selectively operates to prevent the removal of the hot-swappable component from the carrier. More specifically, in one embodiment, the engagement device may operate to prevent the removal of a non-failed component.

In one embodiment, the engagement device 302 may be a mechanical device (e.g., pins, clips, latches, etc.), an electrical device, software, or a combination of devices (e.g., an electro-mechanical device, an electrical device operated using software, etc.). For example, if the engagement device 302 is an electrical device and the hot-swappable component has an ejection button, upon detection of activation of the ejection button, an electrical signal may be sent to a component in the system to eject the component. However, if the system detects that the ejection button that has been operated is on a component that has not failed (i.e., non-failed component), the electrical signal may be rerouted or a different electrical circuit may be utilized so that the component cannot be removed. Alternatively or additionally, the engagement device 302 may be implemented in software. For example, a signal may be sent to the system to indicate that the component is to be removed. Software may compare this signal against another signal indicating the component has not failed and may prevent the removal of the component based on this comparison.

Figure 4:
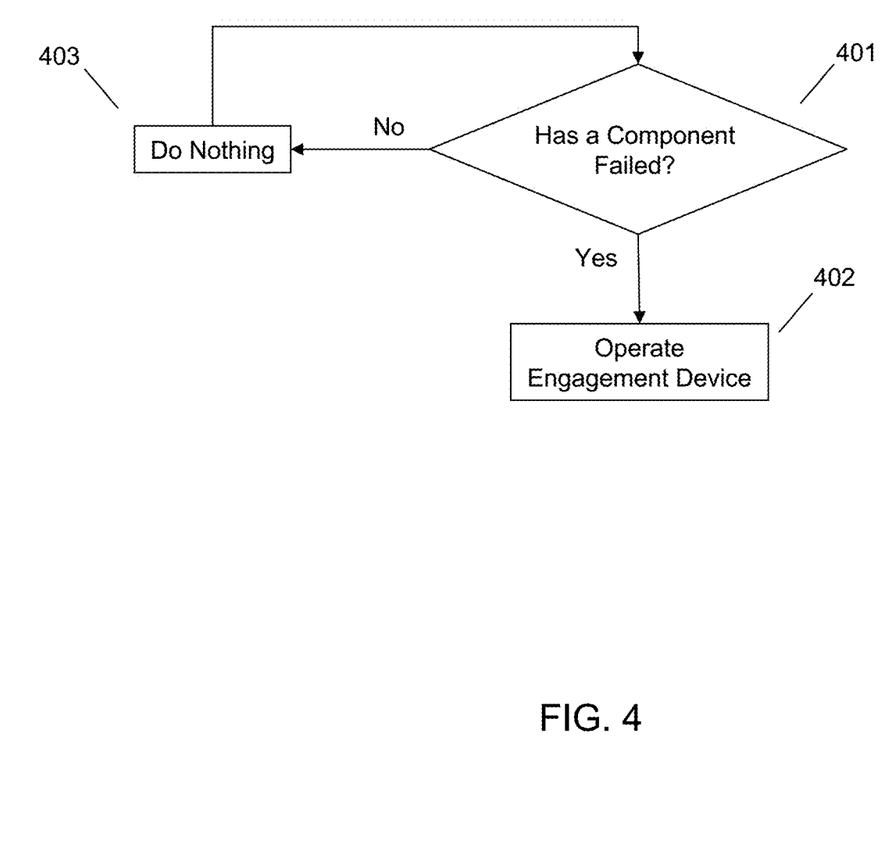
FIG. 4 illustrates an example method of preventing removal of a hot-swappable device.

In one embodiment, the engagement device 302 may be engaged (i.e., the engagement device is in a position to retain the hot-swappable component) upon power on of the system. Referring to FIG. 4, upon detecting at 401, using the detector 304, that a hot-swappable component has failed, an embodiment may operate the engagement device 302, at 402. In one embodiment, this operation at 402 may include disengaging (i.e., the engagement device is in a position to allow removal of the hot-swappable component) the engagement device 302 at the failed hot-swappable component. For example, if a system has components A and B and engagement devices A and B, the system upon power on may have engagement devices A and B engaged. This keeps components A and B from being removed from the system. Upon the detection of the failure of component A, engagement device A would be disengaged, allowing a user to remove component A. Engagement device B would remain engaged, and component B would be unable to be removed.

In another example embodiment, the engagement device 302 may not be engaged upon power on of the system. Upon detecting at 401 that a hot-swappable component has failed, an embodiment may operate the engagement device 302, at 402. This operation at 402 may include engaging the engagement device 302 at the non-failed hot-swappable component. For example, if a system has components C and D and engagement devices C and D, the system upon power on may have engagement devices C and D disengaged, meaning components C and D could be removed from the system. Upon the detection of the failure of component C, engagement device D may be engaged. Component C could be removed because engagement device C would remain unengaged, but component D could not be removed.

In one embodiment, the engagement device 302 may be operatively coupled to the carrier 301. For example, if the engagement device 302 were a pin, it may be installed on the carrier 301. Upon engagement, the pin may move in order to prevent the component from being removed. For example, movement of the pin may be controlled by a servo-motor. For example, if the pin were installed at the top of the carrier, upon engagement the pin may slide down and slide into the hot-swappable component to prevent removal. Depending on the type of device, the engagement device may be installed at different locations on the carrier (e.g., the bottom, the top, the corners, etc.).

In an embodiment, the engagement device 302 may be operatively coupled to the hot-swappable component 303. For example, if the hot-swappable component 303 has an arm that swings out to assist in removal, the engagement device may be installed on the hot-swappable component. For example, if the component detects that a user is pressing the button to swing the arm of the component out but the component has not failed, an engagement device, such as an electrical device, on the component may not allow the arm to swing out so the user cannot remove the component. The engagement device may be mechanical, electromechanical, or electrical in nature.

Referring back to FIG. 3, a detector 304 that detects if a hot-swappable component has failed may be included on the hot-swappable component 303. For example, the hot-swappable component may have circuitry in which it can detect whether it has failed. If the detector is included on the hot-swappable component, in one embodiment, the hot-swappable component may have electrical connections to the system in order to facilitate the detection of the failed component. For example, if the hot-swappable component has detected its failure, it may send a signal to the system to notify the system that it has failed. The system may then operate the engagement device 302. Alternatively or additionally, if the engagement device 302 is included on the hot-swappable component 303, the component may detect that it failed and operate the engagement device 302.

Alternatively or additionally, in one embodiment, the detector 304 may be included in the system in which the hot-swappable component is installed. For example, the system may detect that it can no longer communicate with the hot-swappable component. The system may then operate the engagement device to allow removal of the failed component.

Figure 5:
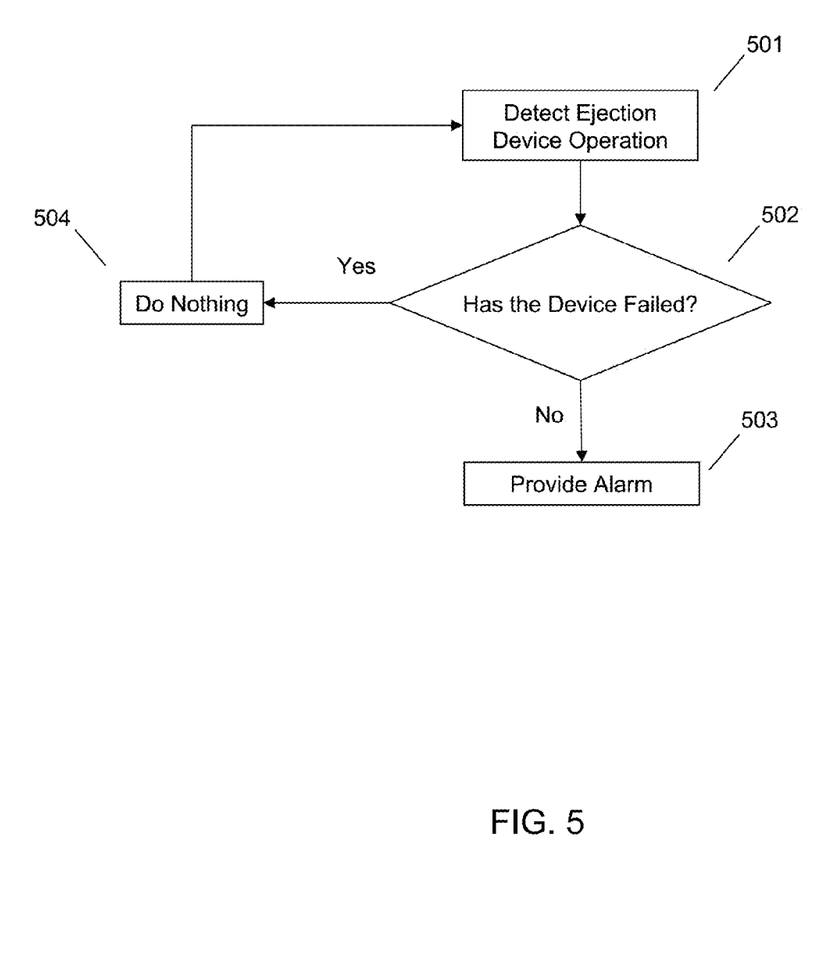
FIG. 5 illustrates another example method of preventing removal of a hot-swappable device.

Alternatively or additionally, an embodiment, may provide an alarm to a user. In one embodiment, the hot-swappable component may have an ejection device, for example, an ejection button, a pull out arm, an actuation device, and the like. Referring to FIG. 5, an embodiment may detect the operation of the ejection device at 501 of a hot-swappable component. At 502, an embodiment may determine whether the ejection device is connected to a component which has failed. If at 502, an embodiment determines that the component has failed, then no alarm will be provided at 504. If, however, at 502 an embodiment determines that the component has not failed, an embodiment may provide an alarm to the user at 503.

The alarm may be an indication to the user that the ejection device which has been operated is for a non-failed hot-swappable component. The alarm provided may be in the form of a light, for example, a flashing light, a different colored light, and the like. Additionally or alternatively, the alarm provided may be an audible alarm, such as a buzzing, dinging, voice command, and the like. Additionally or alternatively, the system may provide a graphical display indicating a non-failed component is being removed. For example, the system may have a display unit (e.g., monitor, touch screen, flat panel display, seven-segment display, etc.) on which a graph may be populated. This graphic may be a pictorial representation (e.g., a big red X, a circle with a line through it, etc.) or it may include text (e.g., "that component has not failed", "NO", etc.).

Accordingly, as illustrated by the example embodiments and the figures, an embodiment provides an apparatus for preventing the removal of a non-failed hot-swappable component. An embodiment may use a mechanical method to engage a device to prevent the removal of the component. For example, a mechanical method may include engaging pins from the carrier to the hot-swappable component to create a barrier to prevent removal of the component. One embodiment may use an electrical device to prevent the removal of a component. For example, if the component includes an ejection button which sends an electrical signal to eject the component, upon depressing the ejection button of a non-failed component, the electrical signal may be rerouted or not sent to the component that ejects the component. This may prevent removal of the component. One embodiment may use software to prevent removal of the component. Upon detection of attempted removal of a non-failed device, software may be used to prevent the removal of the device.

Additionally or alternatively, as illustrated by the example embodiments and the figures, an embodiment may provide a method for alerting the user that they are attempting to remove a non-failed device. This alert may be in the form of a light, audible alarm, or graphical interface informing the user that the device they are attempting to remove has not failed. These methods and systems will help prevent the removal of a non-failed component, helping to ensure that the system remains operational.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   at least one hot-swappable component;
   at least one engagement device, wherein the engagement device selectively operates to prevent removal of a non-failed hot-swappable component from a carrier;
   a detector;
   the detector detecting at least one failed hot-swappable component; and
   an alarm operating upon detection of an attempted removal of a non-failed hot-swappable component.

2. The apparatus of claim 1, wherein the at least one engagement device is engaged, upon detecting the at least one failed hot-swappable component, to retain at least one non-failed hot-swappable component.

3. The apparatus of claim 1, wherein the at least one engagement device is disengaged, upon detecting the at least one failed hot-swappable component, to allow removal of the at least one failed hot-swappable component.

4. The apparatus of claim 1, wherein the at least one engagement device is operatively coupled to the carrier.

5. The apparatus of claim 1, wherein the at least one engagement device is operatively coupled to the hot-swappable component.

6. The apparatus of claim 1, wherein the at least one hot-swappable component is included in a system.

7. The apparatus of claim 6, wherein the detector is operatively coupled to the system.

8. The apparatus of claim 6, wherein the detector is operatively coupled to the at least one hot-swappable component and wherein the at least one hot-swappable component includes electrical connections to the system facilitating the detection of the at least one failed hot-swappable component.

9. The apparatus of claim 1, wherein the engagement device is selected from the group consisting of: a mechanical device, an electrical device, and software.

10. An information handling device, comprising:
at least one hot-swappable component;
at least one processor operatively coupled to the at least one hot-swappable component; and
a memory storing instructions that are executable by the processor to:
detect a failure of at least one hot-swappable component;
operate at least one engagement device upon the detection of the failure, wherein the at least one engagement device is disposed such that upon operation, removal of at least one non-failed hot-swappable component is prevented; and
provide an alarm upon detection of an attempted removal of a non-failed hot-swappable component.

11. The information handling device of claim 10, wherein to operate comprises disengaging the at least one engagement device for at least one failed hot-swappable component.

12. The information handling device of claim 10, wherein to operate comprises engaging the at least one engagement device for at least non-failed one hot-swappable component.

13. The information handling device of claim 10, wherein the at least one engagement device is operatively coupled to a carrier that houses the at least one hot-swappable components.

14. The information handling device of claim 10, wherein the at least one engagement device is operatively coupled to at least one hot-swappable component.

15. A method, comprising:
detecting, using a detector, at least one failed hot-swappable component;
operating, using a processor, at least one engagement device;
the at least one engagement device being disposed such that upon engagement, at least one hot-swappable component is retained preventing removal of the at least one hot-swappable component; and
providing an alarm upon detection of an attempted removal of a non-failed hot-swappable component.

16. The method of claim 15, wherein the activating comprises disengaging at least one engagement device for the one or more failed hot-swappable component.

17. The method of claim 15, wherein the activating comprises engaging the at least one engagement device for at least one non-failed hot-swappable component.

18. The method of claim 15, wherein the at least one engagement device is operatively coupled to a carrier that houses the at least one hot-swappable component.

19. The method of claim 15, wherein the at least one engagement device is operatively coupled to the at least one hot-swappable component.

20. The method of claim 15, wherein the at least one hot-swappable component is included in a system.

21. The method of claim 20, wherein the detector is operatively coupled to the system.

22. The method of claim 20, wherein the detector is operatively coupled to the at least one hot-swappable component and wherein the at least one hot-swappable component includes electrical connections to the system facilitating the detection of the at least one failed hot-swappable component.

23. A method, comprising:
detecting, using a processor, operation of an ejection device of at least one non-failed hot-swappable component; and
providing, using a processor, an alarm to a user;
the alarm indicating that the ejection device has been operated of the at least one non-failed hot-swappable component.

24. The method of claim 23, wherein the alarm is selected from the group consisting of: light, audible alarm, and graphical display.

25. The method of claim 23, wherein the ejection device comprises a button included on the at least one non-failed hot-swappable component.

* * * * *